United States Patent
Cardemon

(10) Patent No.: US 6,202,520 B1
(45) Date of Patent: Mar. 20, 2001

(54) METHOD AND APPARATUS FOR MACHINING HIGHLY CONCENTRIC PARTS

(75) Inventor: Richard A. Cardemon, Muncie, IN (US)

(73) Assignee: Car-Tec Company, Muncie, IN (US)

( * ) Notice: Subject to any disclaimer, the term of this patent is extended or adjusted under 35 U.S.C. 154(b) by 0 days.

(21) Appl. No.: 09/096,127

(22) Filed: Jun. 11, 1998

(51) Int. Cl.⁷ .................................................. B23B 1/00
(52) U.S. Cl. ............................ 82/1.11; 82/47; 82/148; 82/162
(58) Field of Search ............................. 82/1.11, 47, 148, 82/162, 163, 164, 904

(56) References Cited

U.S. PATENT DOCUMENTS

| | | |
|---|---|---|
| 2,851,916 | 9/1958 | Grandy et al. . |
| 3,108,819 | 10/1963 | McKay . |
| 3,145,513 | 8/1964 | Porath . |
| 3,372,721 | 3/1968 | James et al. . |
| 3,561,300 | 2/1971 | Peasley . |
| 3,613,489 | 10/1971 | Randich . |
| 3,625,529 | 12/1971 | Donachy . |
| 3,724,302 | 4/1973 | Randich . |
| 3,935,766 | 2/1976 | Masters . |
| 4,258,598 | 3/1981 | Hoffmann . |
| 4,535,660 * | 8/1985 | Osterman ................................ 82/148 |
| 4,655,105 | 4/1987 | Maxwell et al. . |
| 5,025,689 * | 6/1991 | Mayer .................................. 82/148 X |
| 5,431,416 | 7/1995 | Thornton . |
| 5,615,590 | 4/1997 | Speckhahn . |
| 5,619,895 * | 4/1997 | Kronstorfer .......................... 82/148 |

FOREIGN PATENT DOCUMENTS

| | | |
|---|---|---|
| 618-195 | 6/1976 | (SU) . |
| 617-169 | 2/1977 | (SU) . |
| 674-830 | 6/1977 | (SU) . |
| 686-821 | 10/1977 | (SU) . |
| 679-319 | 2/1978 | (SU) . |
| 658530 | 5/1979 | (SU) . |
| 0658530 * | 5/1979 | (SU) .................................... 82/118 |
| 880-633 | 2/1980 | (SU) . |
| 1105-282 | 4/1982 | (SU) . |
| 1073-003 | 5/1982 | (SU) . |
| 1222-419 | 12/1983 | (SU) . |
| 1222-419 | 4/1986 | (SU) . |
| 1512-706 | 8/1987 | (SU) . |

\* cited by examiner

Primary Examiner—Henry Tsai
(74) Attorney, Agent, or Firm—Woodard, Emhardt, Naughton, Moriarty & McNett

(57) ABSTRACT

Methods and apparatus for machining highly concentric surfaces on a workpiece. In a pre-operation, locating features are machined into either end of a workpiece. These locating features are subsequently pulled apart so as to induce tension in the workpiece. In the state of tension the workpiece is rotated and one or more diameters are machined onto the workpiece.

9 Claims, 3 Drawing Sheets

METHOD AND APPARATUS FOR MACHINING HIGHLY CONCENTRIC PARTS

BACKGROUND OF THE INVENTION

The present invention relates to methods and apparatus for machining one or more highly concentric diametral surfaces on a workpiece. However, certain applications of the present invention may lie outside this field.

It is conventional on some machining operations to machine a workpiece after applying compression to the workpiece. Often this compression force within the workpiece is applied through thrust bearings that are oriented so as to apply compression in the workpiece, but incapable of applying tension in the workpiece without degrading the reliability and safety of the thrust bearing. The compressive force tends to cause the workpiece to bow. Also, there is a natural tendency for the force from the cutting, grinding, milling or other operation, which is applied generally perpendicularly to the compressive force, to further increase the bowing of the workpiece. This bowing results in uneven machining of the workpiece, causing varying amounts of eccentricity among the one or more diameters machined along the length of the workpiece. For example, a diameter machined on a shaft may have excessive runout of the center of the machined diameter relative to the centerline of the shaft.

On workpieces where multiple outer diameters are being machined, the multiple outer diameters as first machined may not be sufficiently concentric with each other, or with the machining centers on the ends of the workpiece that may be used in subsequent operations. For example, two diameters may each be acceptably round, but their centerlines may be shifted from one another. In another example, one diameter may be acceptably round, but another diameter on the same workpiece may be out of round. It may be necessary to support the workpiece in the vicinity of the multiple outer diameters by a pair of rolls. It is often necessary to add a second machining operation to improve the relative concentricities of the multiple diameters. The present invention overcomes the limitations of conventional machining methods and apparatus in a novel and unobvious way.

SUMMARY OF THE INVENTION

One embodiment of the present invention provides for improved apparatus and methods for machining a workpiece with highly concentric diameters. One aspect of the present invention includes grabbing a workpiece at a first position intermediate of the ends of the workpiece. A first locating feature is machined on one end of the workpiece, and a second locating feature is machined on the other end of the workpiece. The workpiece is released at the first position. The first locating feature and the second locating feature are clamped, and tension is applied to the workpiece. The workpiece is machined during the application of tension.

Another embodiment of the present invention provides an apparatus for machining a workpiece. The apparatus includes a first rotatable spindle powered to rotate. The first rotatable spindle is coupled to first means for clamping the workpiece. The apparatus also includes a second rotatable spindle coupled to second means for clamping the workpiece. There is also means for urging the first rotatable spindle apart from the second rotatable spindle when the first clamping means and the second clamping means are clamping ends of the workpiece. The apparatus also includes a machining tool for machining the workplace.

Another embodiment of the present invention is an apparatus which includes a workpiece having two ends with a first locating feature on one end and a second locating feature on the other end. The first locating feature is concentric with the second locating feature. There is also a first means for clamping the workpiece on the first locating feature, the first clamping means being powered to rotate. There is also a second means for clamping the workpiece on the second locating feature, the second clamping means being rotatable. The apparatus also includes means for urging the first clamping means from the second clamping means, and a machining tool for machining the workpiece.

One object of the present invention to provide an improve method for machining a highly concentric part.

These and other objects will be apparent from the description of the preferred embodiment, the drawings, and the claims to follow.

DESCRIPTION OF THE PREFERRED EMBODIMENT

Figure 1:
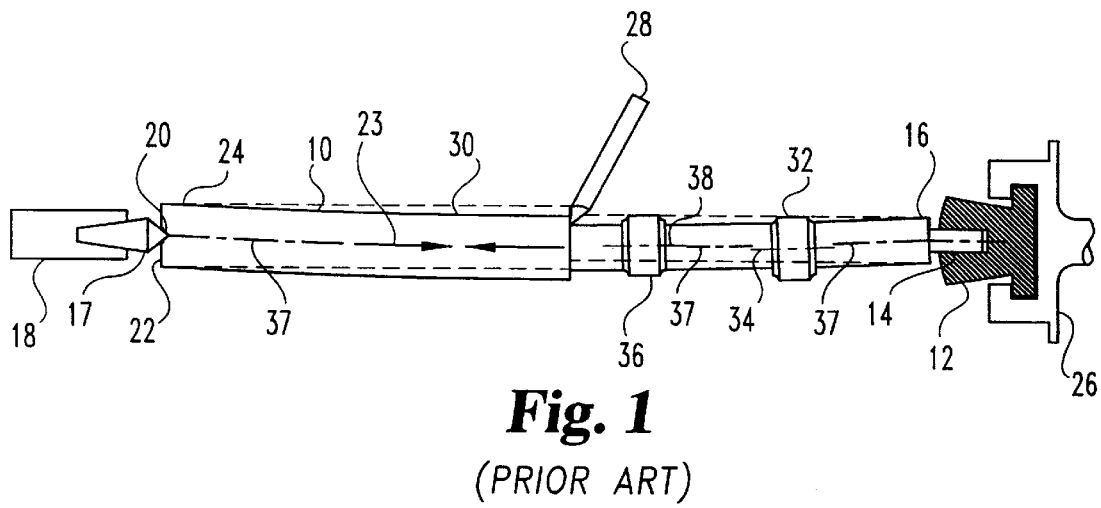
FIG. 1 is a schematic representation of a workpiece being machined on a lathe in accordance with the prior art.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the illustrated device, and any further applications of the principles of the invention as illustrated therein are contemplated as would normally occur to one skilled in the art to which the invention relates.

The present invention provides improved methods and apparatus for machining a workpiece with multiple diameters that should be highly concentric with each other, for machining a workpiece in which a single diameter should be highly concentric with the centerline of the workpiece, and other related cases. The present invention applies to any manufacturing process, such as by way of example only turning, milling, grinding, or other manufacturing processes performed on a rigid shaft, tube, bar, forging, casting, or any shape in any material where runout, concentricity, or eccentricity is critical. Because of the improvement in comparative runout, concentricity, and eccentricity it may not be necessary to green grind or pregrind the workpiece before or after machining the one or more diameters.

One embodiment of the present invention involves a first operation to machine locating features on either end of the rigid workpiece. In a following operation, the machine tool assembly locates and clamps the locating features and applies tension in the workpiece as the workpiece is machined. The degree of tension in the workpiece is relatively small, such that the workpiece is not distorted from its free state, and in one embodiment is less than about 100 pounds. The tensile stress in the workpiece is also low, and in another embodiment is generally less than about 400 PSI. The present invention is also applicable in heat treating operations where the workpiece is placed in tension while being heated in a furnace, and reduces the distortion or warping that may occur during heat treating.

The term workpiece as used herein refers to a non-flexible shaft, thick walled tube, bar, forging, casting, or any other rigid shape on which one or more inner or outer diameters are to be machined such that the diameters are highly concentric with each other. The term concentric or concentricity as used herein refers to the difference between the centerlines of multiple diameters or the difference between the centerline of a diameter and a centerline of the workpiece, and also includes those machining irregularities otherwise referred to as runout or eccentricity.

Figure 2:
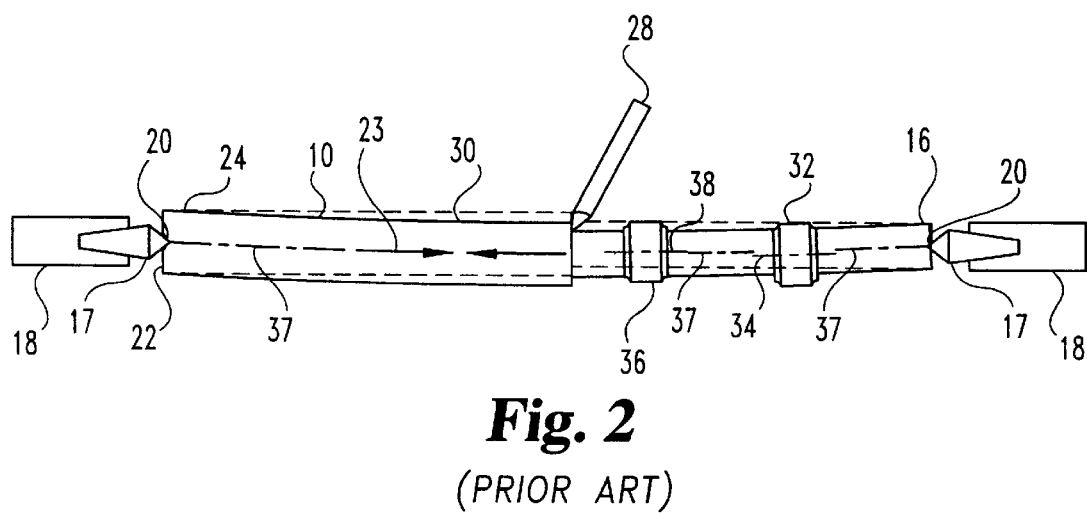
FIG. 2 is a schematic representation of a workpiece being machined on a lathe in accordance with the prior art.

FIG. 1 is a schematic representation of a workpiece being machined on a lathe in a prior art manner. A workpiece 10 is restrained by a chuck 12 that locates on a chucking diameter 14 which has been machined onto end 16 of shaft 10. A centering tip 17 that is part of a tailstock 18 of the lathe locates within a centered indentation 20 that has previously been machined into end face 22 at second end 24 of shaft 10. A first spindle 26 is coupled to chuck 12 and is powered to rotate chuck 12 and shaft 10. Spindle 26 and tail stock 18 are coupled to the lathe frame (not shown). In a manner well known in the art a compressive load is imposed upon shaft 10 by first spindle 26 and tail stock 18, as indicated by compression force arrows 23. Machine tool 28 removes material from shaft 10. FIG. 2 depicts an alternate prior art method of machining in which workpiece 10 is located between a pair of tailstocks 18 and centering tips 17 that locate on a pair of centering indentations 20 on each end 16 and 24. One of the tailstocks 18 is powered to provide rotation to workpiece 10.

In this known method of machining a shaft, various loads and effects combine to create a bowing in the shaft, as indicated in FIGS. 1 and 2 by the deviation of shaft 10 from the dotted straight lines. The side load imposed by machine tool 28 causes shaft 10 to bow. Bowing is also increased by the compressive load imposed upon ends 16 and 24, and from whipping of shaft 10 as a result of centrifugal loads. Also, this bowing effect increases as machine tool 28 removes stock of shaft 10 from rough outer diameter 30 and shaft 10 becomes more flexible. The bowing of shaft 10 also contributes to uneven tool pressure on shaft 10 which can degrade the surface finish of the machined surfaces.

As shown in FIGS. 1 and 2, machine tool 28 has cut an outer diameter 32 which has a local centerline 34. Another outer diameter 36 with a local centerline 38 has also been cut into shaft 10. Because of the bowing effect due to compression of shaft 10, outer diameters 32 and 36 are non-concentric, the respective local centerlines 34 and 38 being displaced from one another. In addition, local centerlines 34 and 38 are displaced relative to centerline 37 of workpiece 10. This lack of concentricity between outer diameters 32 and 36, the runout of diameter 32 relative to centerline 37 of workpiece 10, and the runout of diameter 36 relative to the centerline of workpiece 10 often requires subsequent machining of the diameters to improve these machining irregularities.

Figure 3:
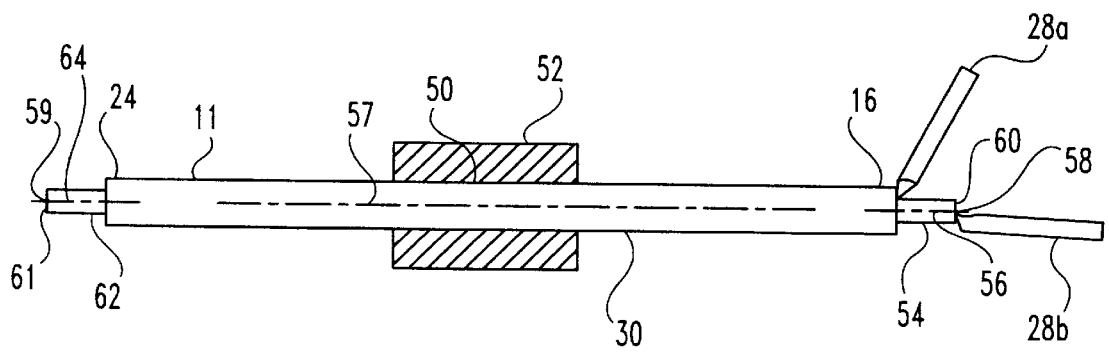
FIG. 3 is a schematic representation of a workpiece being machined according to one embodiment of the present invention.

FIG. 3 is a schematic representation of a workpiece being machined according to one embodiment of the present invention. The workpiece is depicted as a shaft, but may be of any configuration. One embodiment of the present invention includes holding workpiece 11 in a first mounting at a first position 50 intermediate of shaft ends 16 and 24. A chuck 52 holds and thereby locates on rough outer diameter 30 at first position 50. Chuck 52 and shaft 30 are rotated in a manner known in the art. Machine tool 28a machines first locating feature 54 with a local centerline 56. Another machine tool 28b machines a centered indentation 58 on first end face 60 of workpiece 11. Centered indentation 58 is machined before releasing shaft 11 from chuck 52, ensuring that the centerline of indentation 58 will be aligned with local centerline 56 of first locating feature 54. Local centerline 56 is aligned with centerline 57 of workpiece 11.

In addition to what has been described, the present invention also contemplates those embodiments in which the chuck is stationary, and the machine tool rotates about the workpiece. These embodiments may be preferable for certain types of workpieces, or for utilization of existing machining equipment.

Second locating feature 62 with local centerline 64 is machined into second end 24 of shaft 11 in a manner similar to that for locating feature 54. A centered indentation 59 aligned with centerline 64 is machined into face 61 of workpiece 11. Local centerline 64 is aligned with centerline 57 of workpiece 11. It is preferable that locating features 54 and 62 and indentations 58 and 59 are machined into shaft 11 prior to releasing shaft 11 from chuck 52. Indentations 58 and 59, which may be required for centering in subsequent machining operations, are thus concentric to each other and to locating features 54 and 62, respectively. It is preferable but not necessary that locating features 54 and 62 be identical to each other. The present invention also contemplates a locating feature 54 that is different than locating feature 62, wherein the locating features are suitable for applying tension to workpiece 11.

FIG. 3 schematically depicts one embodiment of the present invention which includes a pre-operation for placing locating features on the ends of a workpiece. These locating features are useful for applying a tension load in the workpiece during subsequent machining. In one embodiment of the present invention the locating features are outer diameters. A chuck, collet, or other clamping device applies tension within the workpiece by means of friction on the locating features.

Figure 4:
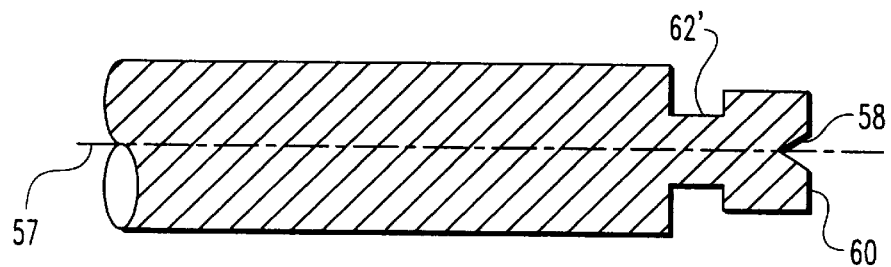
FIG. 4 is a cross sectional view of a locating feature on a workpiece according to another embodiment of the present invention.
Figure 5:
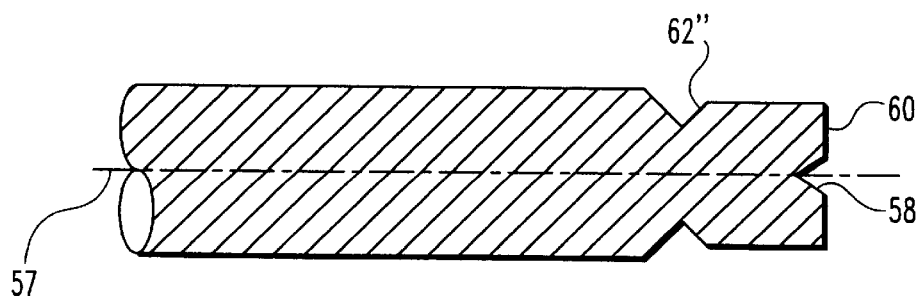
FIG. 5 is a cross sectional view of a locating feature on a workpiece according to another embodiment of the present invention.

The present invention also contemplates other types of locating features, such as by way of example only, threaded ends or shoulders on the ends of the workpiece, or other configurations suitable for applying a tensile force. FIG. 4 shows a cross section of a workpiece with a squared shoulder 62'. FIG. 5 shows a cross section of a workpiece with an angular V groove shoulder 62". Locating features 62' and 62" are useful for applying tension loads on the workpiece during subsequent machining.

Figure 6:
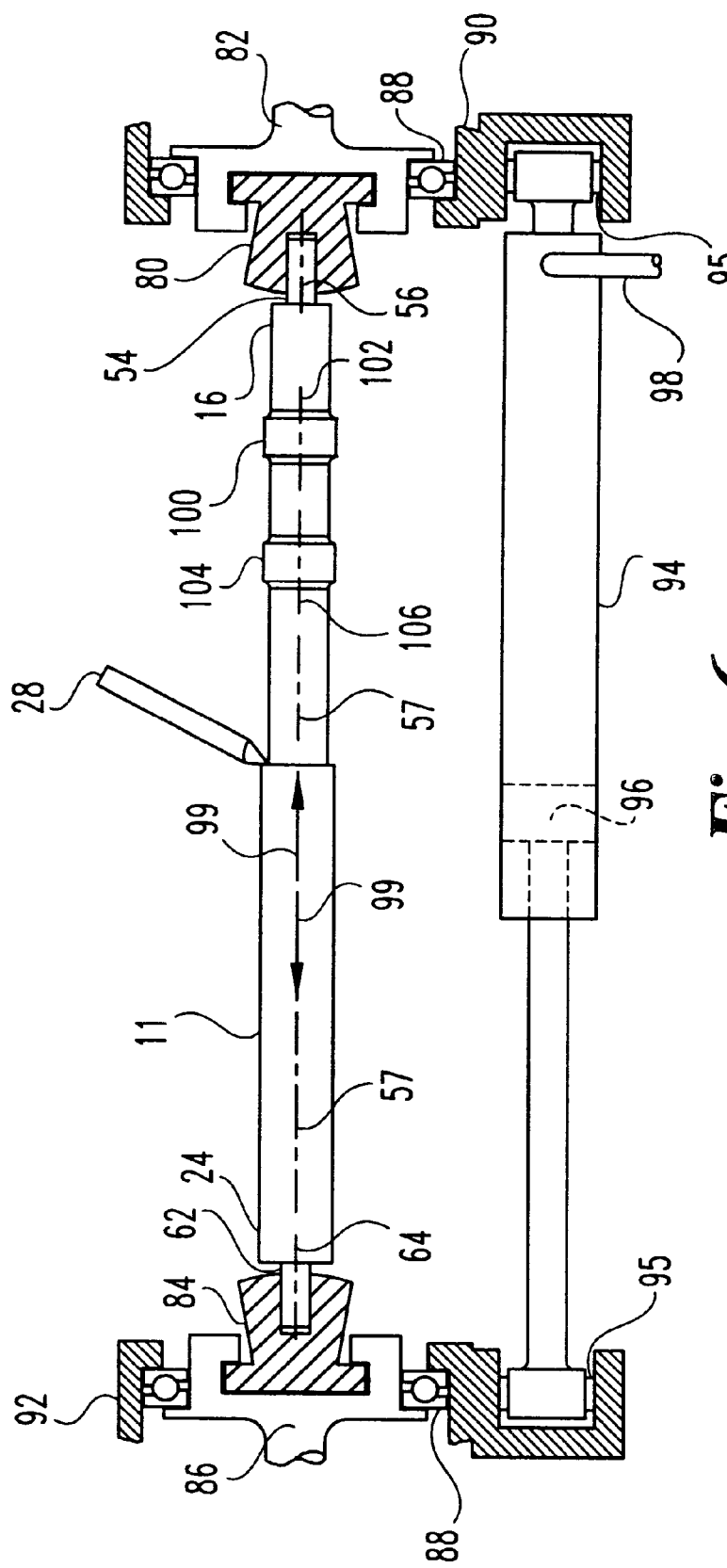
FIG. 6 is a schematic representation of one embodiment of an apparatus for machining a workpiece according to the present invention.

FIG. 6 is a schematic representation of one embodiment of an apparatus for machining a workpiece according to the present invention. A workpiece 11 which has incorporated in it locating features 54 and 62 is installed on a machining apparatus. A first means for clamping and/or coupling 80 locates on first locating feature 54. Clamping means 80 is coupled to a first rotatable spindle 82 which is powered so as to turn workpiece 11 at rotational speeds suitable for machining. A second means for clamping or coupling 84 locates on second locating feature 62 at end 24 of shaft 11. Clamping means 84 couples to locating feature 62. Clamping means 84 is coupled to a second rotatable spindle 86. In the preferred embodiment second spindle 86 is powered to rotate synchronously with first spindle 82. In other embodiments of the present invention second spindle 86 is not powered but is free to spin and is driven by spindle 82 through shaft 11. Clamping means 80 and 84 may be a chuck, collet, or other clamping device suitable for clamping, grasping, holding, or coupling to any locating feature described herein or their equivalents, or other locating features suitable for applying tension known to those of ordinary skill in the art.

Clamping means 80 and 84 are preferably separable from spindles 82 and 86, respectively. However, in some embodiments of the present invention clamping means 80 is integral with spindle 82 and clamping means 84 is integral with spindle 86. Clamping means 80 and 84 are compatible with the type of locating feature machined into workpiece 11. For example, if the locating features are screw threads, then clamping means 80 and 84 will incorporate threads compatible with the threads of the workpiece. As another example, if the locating features are shoulders, then clamping means 80 and 84 include a shoulder which suitably couples to the shoulder of the workpiece.

First rotatable spindle 82 is coupled to first member 90 of the machine apparatus by thrust bearing 88. Second rotatable spindle 86 is coupled to second member 92 of the lathe through a similar thrust bearing 88. Thrust bearings 88 are arranged and configured to apply a force that results in tension within workpiece 11. Spindle 82 and member 90 are slidable relative to spindle 86 and member 92, and are urged apart by means for urging 94. Urging means 94 is constructed and arranged to produce sufficient force so as to apply tension within workpiece 11 as indicated by tension force arrows 99. In a preferred embodiment, urging means 94 is a hydraulic cylinder which is coupled to members 90 and 92 by pivotal attachments 95 that permit pivotal motion and reduce the chances of binding as the tension load is applied. Hydraulic fluid applied through fluid port 98 applies a pressure force on piston 96 that urges member 90 and spindle 82 apart from member 92 and spindle 86, such that a tensile force 99 is induced in shaft 11.

Although urging means 94 has been shown and described as a hydraulic cylinder, there are other equivalent means for urging apart spindle 82 from spindle 86. By way of example only, one of spindles 82 or 86 could be held fixed, and a dead weight or spring could be used to load the other spindle. By further way of example, cylinder 94 could also be actuated pneumatically. Additionally, spindles 82 and 86 can be urged apart by an electric motor. In some embodiments of the present invention there may be multiple urging means 94 for urging apart first spindle 82 from second spindle 86. For example, some embodiments of the present invention may include one or more additional hydraulic cylinders located so as to urge apart spindles 82 and 86 and not create a torque or a moment on spindles 82 or 86 or within workpiece 11.

After clamping workpiece 11 by first locating feature 54 and second locating feature 62 and applying tension within shaft 11, machining of shaft 11 is accomplished by a machine tool, such as machining tool 28. Shaft 11 is rotated at a speed suitable for machining. Because of the aforementioned method in which first locating feature 54 and second locating feature 62 were machined into workpiece 11, their respective centerlines 56 and 64 are coincident with each other and are also coincident with centerline 57 of workpiece 11, and form a common axis about which spindles 82 and 86 rotate. Cutting tool 28 moves in a manner so as to remove material from workpiece 11. Because of the tension applied to workpiece 11, it remains straight and does not bow as it would if compressive forces were applied. As parts of shaft 11 are machined to a smaller diameter and become less stiff, shaft 11 remains generally straight and does not bow because tensile load 99 tends to counteract bowing.

Machine tool 28 machines first outer diameter 100 and preferably second outer diameter 104 intermediate of locating features 54 and 62. Because of the method of machining the locating features, the tension applied in workpiece 11, and the other features of the invention described herein, first outer diameter 100 and second outer diameter 104 are highly concentric with each other. Also, each diameter 100 and 104 is highly concentric with centerline 57 of the workpiece.

The tensile load induced in shaft 11 is relatively low. Some of the force applied by urging means 94 is used to overcome preloads in the bearings and other elements of the lathe, and thus the amount of tension applied by urging means 94 may be greater than the amount of tension load 99 within workpiece 11. Tensile load 99 in workpiece 11 creates only small elastic stresses, and does not cause any permanent deformation of shaft 11. It is preferable that tension force 99 be so low as to not cause significant elastic deformation of shaft 11. For example, if shaft 11 is slightly bowed prior to machining from a forging process or for other reasons, the tensile force preferably should not straighten shaft 11. If the tensile force is large enough to effect the straightness of the shaft, then the various diameters would be out of concentric with each other when tension force 99 is released and the workpiece assumes a different shape.

In one embodiment of the present invention, a 1-inch diameter steel shaft is machined with a tensile load 99 of about 100 pounds, creating an average tensile stress in the shaft of about 120 pounds per square inch. Because of this low tension force, any of the locating features described herein, their equivalents, or other locating features suitable for tensioning a workpiece known to those of ordinary skill in the art may be used to apply the tension to shaft 11.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for machining a workpiece, comprising:
   holding a workpiece at a first position intermediate of the ends of the workpiece in a first mounting;
   machining a first locating feature on one end of the workpiece during said holding;
   machining a second locating feature on the other end of the workpiece during said holding;
   releasing the workpiece at the first position from the first mounting after said machining a second locating feature;
   applying tension to the workpiece through the first locating feature and the second locating feature; and
   machining the workpiece during said applying.

2. The method of claim 1 wherein said machining the workpiece includes machining a first outer diameter, the first outer diameter being on the workpiece intermediate of the first locating feature and the second locating feature.

3. The method of claim 2 wherein said machining the workpiece includes machining a second outer diameter, the second outer diameter being on the workpiece intermediate of the first locating and the second locating diameter, the second outer diameter being concentric with the first outer diameter.

4. The method of claim 1 wherein the one end of the workpiece has a face and which further comprises machining a first centered indentation on the one end face of the workpiece before said releasing.

5. The method of claim 4 wherein the other end of the workpiece has a face and which further comprises machining a second centered indentation on the other end face of the shaft before said releasing.

6. The method of claim 5 which further comprises:

centering the workpiece with the first centered indentation and the second centered indentation after said machining the workpiece during said applying; and machining the workpiece during said centering.

7. A method for machining a workpiece, comprising:

holding a workpiece at a first position intermediate of the ends of the workpiece in a first mounting;

machining a first locating feature on a first end of the workpiece during said holding, the workpiece having a second locating feature on the second end of the workpiece;

machining a first centered indentation on the first end of the workpiece during said holding;

releasing the workpiece at the first position from the first mounting after said machining a first centered indentation and after said machining a first locating feature;

applying tension to the workpiece through the first locating feature and the second locating feature after said releasing; and machining the workpiece during said applying.

8. The method of claim 7 which further comprises:

machining a second centered indentation on the other end of the workpiece during said holding.

9. The method of claim 8 which further comprises:

centering the workpiece with the first centered indentation and the second centered indentation after said machining the workpiece during said applying; and machining the workpiece during said centering.

* * * * *